US008418235B2

(12) United States Patent
Sherkin et al.

(10) Patent No.: US 8,418,235 B2
(45) Date of Patent: Apr. 9, 2013

(54) CLIENT CREDENTIAL BASED SECURE SESSION AUTHENTICATION METHOD AND APPARATUS

(75) Inventors: Alexander Sherkin, Newmarket (CA); Michael Shenfield, Richmond Hill (CA)

(73) Assignee: Research In Motion Limited, Waterloo (CA)

( * ) Notice: Subject to any disclaimer, the term of this patent is extended or adjusted under 35 U.S.C. 154(b) by 1467 days.

(21) Appl. No.: 11/559,923

(22) Filed: Nov. 15, 2006

(65) Prior Publication Data

US 2008/0114983 A1    May 15, 2008

(51) Int. Cl.
*G06F 7/04* (2006.01)
*G06F 15/16* (2006.01)
*G06F 17/30* (2006.01)
*H04L 29/06* (2006.01)
*G06F 12/00* (2006.01)
*G06F 12/14* (2006.01)
*G06F 13/00* (2006.01)
*G11C 7/00* (2006.01)

(52) U.S. Cl.
USPC ............... 726/5; 726/17; 726/18; 726/19

(58) Field of Classification Search .......... 726/2, 3, 726/5, 17–21
See application file for complete search history.

(56) References Cited

U.S. PATENT DOCUMENTS

| 6,539,479 | B1 * | 3/2003 | Wu | 713/151 |
| 2001/0054155 | A1 * | 12/2001 | Hagan et al. | 713/193 |
| 2002/0062452 | A1 * | 5/2002 | Ford | 713/201 |
| 2002/0078351 | A1 | 6/2002 | Garib | |
| 2003/0012387 | A1 | 1/2003 | Gilbert et al. | |
| 2004/0158714 | A1 | 8/2004 | Peyravian et al. | |
| 2005/0114712 | A1 * | 5/2005 | Devine et al. | 713/201 |
| 2006/0005263 | A1 * | 1/2006 | Hardt | 726/28 |
| 2006/0053296 | A1 * | 3/2006 | Busboom et al. | 713/182 |
| 2006/0064458 | A1 * | 3/2006 | Gehrmann | 709/203 |
| 2006/0079205 | A1 * | 4/2006 | Semple et al. | 455/411 |
| 2006/0104441 | A1 * | 5/2006 | Johansson et al. | 380/44 |
| 2007/0038855 | A1 * | 2/2007 | Brown et al. | 713/161 |
| 2007/0050635 | A1 * | 3/2007 | Popp | 713/185 |
| 2007/0113269 | A1 * | 5/2007 | Zhang | 726/4 |

FOREIGN PATENT DOCUMENTS

| JP | 10285154 | 10/1998 |
| JP | 2005-509938 | 4/2005 |
| KR | 2000-22249 | 4/2000 |
| KR | 1020000022249 A | 4/2000 |
| WO | 9750205 | 12/1997 |
| WO | 03042798 | 5/2003 |

OTHER PUBLICATIONS

European extended search report—EP 06124154.3 dated Apr. 26, 2007.
Sengodan s; Smith D; Abou-Rizk M: "On End-To-End Security for Bluetooth/WAP & TCP/IP Networks" proceedings of IEEE International Conference on Personal Wireless Communications (ICPWC), No. XP10534082, Dec. 17, 2000, pp. 399-403, Piscataway, NJ, USA.

(Continued)

*Primary Examiner* — Edan Orgad
*Assistant Examiner* — Jahangir Kabir
(74) *Attorney, Agent, or Firm* — Moffat & Co.

(57) ABSTRACT

A method and apparatus for client credential based authentication of messages between a client and a server, the client and server both knowing the client credential, the method comprising the steps of: utilizing the client credential to create a key; and using the key to authenticate messages between the client and the server.

35 Claims, 4 Drawing Sheets

OTHER PUBLICATIONS

Examiner's Report, EP 05124154.3 dated Jan. 27, 2009.
Korean Application No. 10-2007-0114435, Office Action dated Sep. 30, 2009.
Chinese application No. 200710186094.6, Office Action, dated Jan. 8, 2010.
Password-Based Key Derivation Function 2 (PBKDF2), A JavaScript implementation (version 1.1), Parvez Anandam; http://anandam.name/pbkdf2/; 2007 Parvez Anandam.

SSH Transport Layer Protocol; T. Ylonen, SSH Communications Security Corp, C. Lonvick, Ed. Cisco Systems, Inc., Jan. 2006.
Japanese application No. 2007-285466, Office Action dated Nov. 2, 2010.
D.W. Davies, W.L. Price/translation supervisor Tadahiro Uezono, "Security for Computer Networks", Japan, Nikkei-McGraw-Hill Inc., Dec. 5, 1985, 1st Edition 1st print, p. 114-117, 123-132.
Korean application No. 10-2007-0114435, Notice of Decision for Patent, dated Apr. 28, 2010.

* cited by examiner

CLIENT CREDENTIAL BASED SECURE SESSION AUTHENTICATION METHOD AND APPARATUS

FIELD OF THE DISCLOSURE

The present disclosure relates to secure session authentication and in particular relates to the establishment of a secure authenticated session without significant computational overhead.

BACKGROUND

In a client-server environment, communications between the client and server will often need to be authenticated. Specifically, often one computing device communicates with another computing device (client and server) over a network to access certain services. In order to ensure the client and server are genuine, thereby maintaining identity and data integrity, authentication is required.

Several solutions exist for authenticating communications between a server and client. In one solution, the session can be authenticated with simple authentication. The majority of secure web servers on the Internet today use some form of simple authentication such as basic authentication or HTTP (Hyper Text Transfer Protocol) Post-based authentication over SSL/TLS (Secure Socket Layer/Transport Layer Security) to authenticate a session. Then, the authenticated session is identified by a token stored in or on the client in an HTTP cookie. This scheme is complex since it requires SSL/TLS. To properly support SSL and TLS, a client needs to include relatively strong cryptographic capabilities. For example, a public/private key system could be used. However, the use of such strong cryptographic capabilities on a simple client, such as a wireless data device or a personal digital assistant (PDA), may not be possible depending on the device. Further, if being used in a wireless environment, the use of this form of authentication requires numerous exchanges of information just to establish a channel. With wireless devices, the delays in the wireless space and the cost in terms of network bandwidth, battery life and data transmission costs may be too high.

An alternative solution is to use a simpler cryptographic method. Such schemes include challenge-response sequences such as NTLM (Windows NT LAN Manager) authentication. Referring to NTLM authentication, this is a Microsoft proprietary HTTP based challenge-response authentication mechanism that authenticates a TCP (transmission control protocol) connection. Since data integrity of HTTP traffic over NTLM authenticated connections is not protected, an HTTP message can be changed, removed or injected by an attacker. Thus, even though a session has been authenticated, data source authentication for HTTP messages is not guaranteed.

A more secure solution to the simple cryptographic method above is therefore required. However, the solution cannot be too computationally intensive in order to allow the solution to be widely implemented.

BRIEF DESCRIPTION OF THE DRAWINGS

The present disclosure will be better understood with reference to the drawings in which.

DETAILED DESCRIPTION

The present disclosure overcomes the above by providing for a secure session authentication method and apparatus in which data integrity is maintained by utilizing client credentials known to both the client and server. Specifically, the present disclosure utilizes a shared secret already known to both the client and server for a particular form of communication.

In one embodiment, the password for the client device, which would already be known by the server, is used as the shared credential.

Various extensions to the above, including the creation of a session, the use of other known information combined with a password to create a hash key, the use of secure pseudo-random number generators to expand the shared credentials, the use of sequence numbers to prevent addressing replay, among others, are described.

The present disclosure therefore provides a method for client credential based authentication of messages between a client and a server, said client and server both knowing said client credential, the method comprising the steps of: utilizing the client credential to create a key; and using the key to authenticate messages between the client and the server.

The present disclosure further provides a client device adapted for client credential based authentication of messages between the client device and a server, said client device and server both knowing said client credential, the client device comprising: memory for storing the shared credential; a processor communicating with said memory and adapted to: utilize the client credential to create a key; use the key and a message to create a message authentication code; and add the message authentication code to the message to create a secure message; and a communication subsystem adapted to send the secure message.

Figure 1:
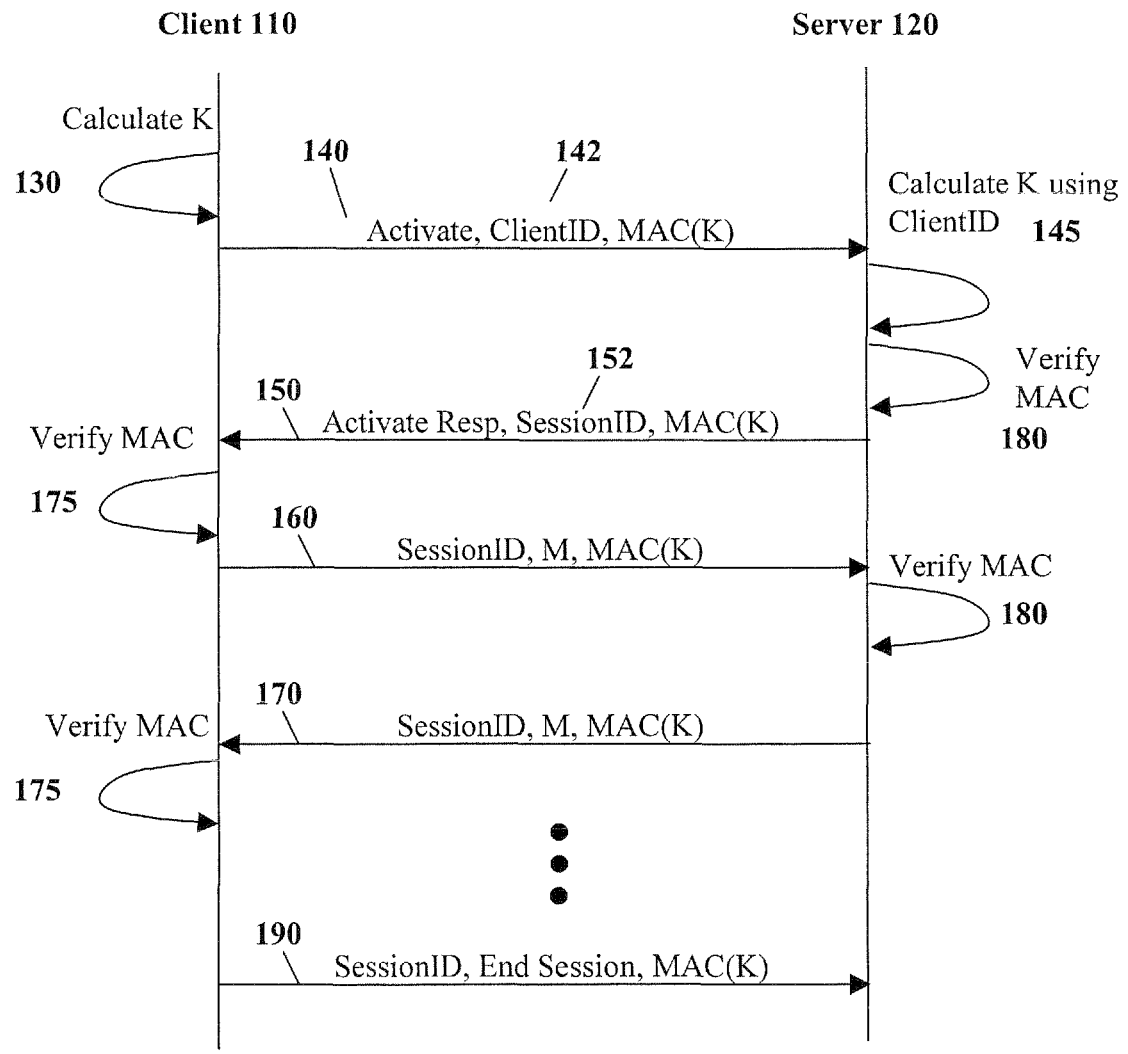
FIG. 1 is a data flow diagram showing exemplary communications between a client and a server.

Reference is now made to FIG. 1. In the exemplary process of FIG. 1, a client 110 communicates with a server 120. In order to ensure that communications in either direction are authentic and data insertion or alternation does not occur, the present disclosure provides for communication in which a message text is appended with an identifier that can be reproduced on either end of the communication.

In a preferred embodiment, the identifier appended is a message authentication code (MAC). MAC is well known in the art and includes two inputs. Specifically, these are the text that the MAC is being appended to and a secret key. A combination of the two enables a hash to be produced and without knowledge of the secret key, the hash cannot be reproduced. As would be appreciated by those skilled in the art, the hash value is generally large enough so that a random value will not be valid.

Various MAC algorithms could be used. One example is the HMAC algorithm. Such an algorithm can be, for example:

$$HMAC_K(m)=h((K\oplus opad)\|h((K\oplus ipad)\|m))$$

Where K is the key, opad and ipad are constants and m is a message. H is a secure hash function. The $\oplus$ symbol denotes a bitwise exclusive or (XOR) and the $\|$ symbol denotes concatenation.

If "h" is chosen to be a SHA1-algorithm, the algorithm becomes SHA1-HMAC, and it can be implemented on a simple device.

Referring again to FIG. 1, the client 110 wishes to communicate with server 120 before a session has been activated. In step 130, client 110 calculates a key (K). This key is based on a client credential known to both the client 110 and server 120. For example, the key can be based on a password on a client 110. The server would already have this password, and thus there is no requirement to send the password over a communications channel.

As will be appreciated by those skilled in the art, the MAC function may require a key to be of a certain length. Therefore, before the password can be used as a key, it may need to be modified through various algorithms to create a key of a desired length. Such a deterministic algorithm would be known to those skilled in the art and various algorithms could be used.

One such algorithm could be the repeating of an encoded password string until a desired number of bits has been reached. Others include hashing a password with a secure hash function such as SHA1 to expand and produce a certain number of bits and then removing any excess bits that are not required. Another approach might be using the password or other client credential with a secure pseudo-random number generator (PRNG). The password or client credential could be the seed for the secure pseudo-random number generator and as long as both the server and client had the same pseudo-random number generator, the required number of bits outputted by a secure PRNG will constitute the key. Other algorithms would be known to those in the art.

Other secure information could be added to password to improve entropy. For example, birthday, city of birth, mother's maiden name, among other information known to both the client and server could be added to password and used as part of a security token to seed the PRNG or as an argument of secure hash function to produce the key. Such additional secure information is provided by client offline.

As will be appreciated by those skilled in the art, a secure hash function is not reversible. Also given a sequence of random bytes produced by a secure PRNG, it is impossible to calculate the seed that was used by PRNG to generate this sequence. Hence, when a secure hash function or a secure PRNG is used for key generation, even if a key for a given session is compromised, the password will not be immediately recovered.

As will be appreciated, the expansion of the password into a predetermined length for a key K would preferably use the entire password as opposed to only parts of it, since this would provide for a more secure key.

The process next proceeds to step 140. In step 140, client 110 sends an activate message to server 120. The activate message preferably includes an identifier to identify the client, such as a client ID 142. The message further includes the MAC for the activate message. As will be appreciated by those skilled in the art, the MAC includes message information along with the key that was calculated in step 130.

In one example the message can be an HTTP message. If a user is attempting to establish a secure session over HTTP, the MAC could be added to the HTTP footer. This example is however not limiting, and other message types are contemplated.

In step 145, server 120 calculates the key for the client identifier received in the message from step 140. The server 120 knows the common secret from the client credentials of client 110 and therefore can use the client ID to find these client credentials and to calculate the key based on the same algorithm that client 110 used to calculate the key K. Once the key is calculated in step 145, it can be stored locally on server 120 and associated with client ID 142 or a session identifier in order to eliminate the need to recalculate the key for any subsequent messages received from client 110.

In step 150, server 120 sends an activate response back to client 110 along with session identifier 152 and a MAC for the activate response message. Again, the MAC is calculated based on the shared key and the contents of the activation response message.

Once client 110 has received session identifier 152, the session identifier can be included in subsequent messages sent to the server 120 as shown in step 160. Similarly, messages from server 120 to client 110 can also include the session identifier as shown in step 170.

Any message, including activation messages and subsequent messages as part of a session, needs to be verified. When client 110 receives a message it needs to verify the MAC of the message to ensure the message is authentic. This is done by taking the message that has been received and hashing it with the key of client 110. The result of this hash is compared with the MAC that is being sent from server 120. This is illustrated as step 175.

Similarly, when server 120 receives a message from a client 110 it hashes the message with the key for the specific client ID and compares this with the MAC that was sent from client 110. This is illustrated in step 180.

If either of the verification steps 175 or 180 produces a result that does not match with the MAC being sent from client 110 or from server 120 respectively, the message is considered to be invalid and could be a spoof or it could be attempt by someone to insert data or remove data from the message. The message could be ignored or an error sent back to the originator.

After finishing with the session, either the server 120 or client 110 can tear down the session by sending a message in step 190 to the other party. The message includes a session identifier and an end session message. This end session message is accompanied with the MAC for the end session, the session identifier and the key K. If the message in step 190 is verified the session will then be ended.

Figure 2:
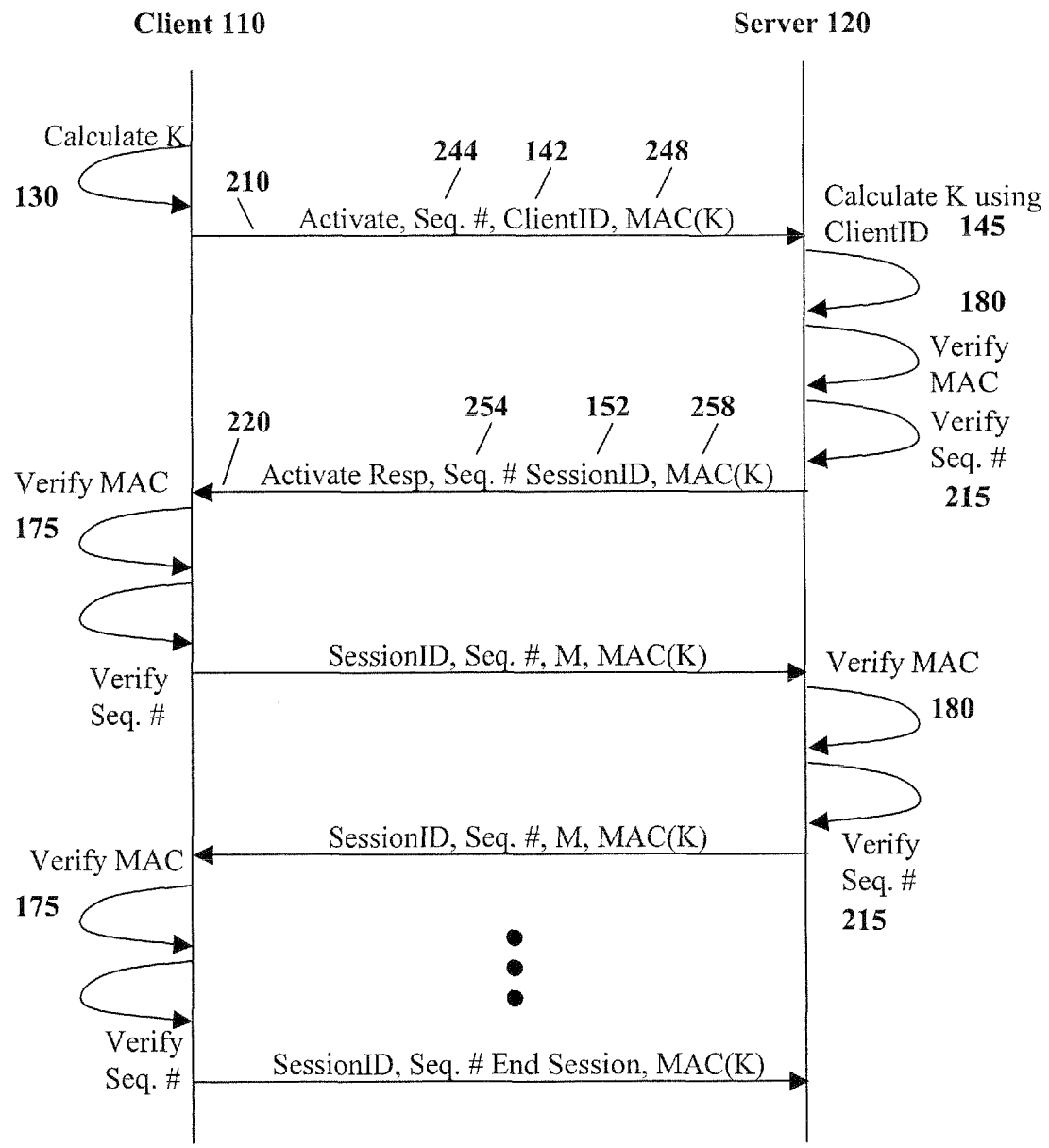
FIG. 2 is a data flow diagram showing alternative exemplary communications between a client and a server.

Reference is now made to FIG. 2. FIG. 2 shows a dataflow diagram between a client 110 and the server 120 and provides an alternative embodiment to the embodiment of FIG. 1. Specifically, the embodiment of FIG. 1 does not prevent addressing replay and if a designer of a system is concerned about addressing replay attacks, the method of FIG. 2 could be used instead.

As will be appreciated by those skilled in the art, a third party snooping communications between a client 110 and server 120, when utilizing the method of FIG. 1, could intercept a message and could resend that message to server 120. In the method of FIG. 1, server 120 performs the same verification 180 and finds that the message is valid and sends an appropriate response. In some cases it is undesirable to allow such addressing replay attacks to occur. In this case, sequence numbers could be used as part of the message.

Specifically, client 110 calculates the key K in step 130 as in FIG. 1. A message is then sent in step 210, which includes an activation message, a client identifier 140, a sequence number 244 and a MAC 248. MAC 248 is calculated based on the message which now includes the sequence number 244. The inclusion of a sequence number into the MAC calculation prevents someone from subsequently inserting a different sequence number in order to try to spoof client 110.

When server 120 receives message from step 210, it calculates the key for the client ID 142 in step 145 as in the method of FIG. 1. Further, it verifies the MAC in step 180 as in FIG. 1. The process also verifies the sequence number in step 215. This involves checking whether or not the server 120 has previously received the sequence number from the particular client ID, and if yes, ignoring the message. As will be appreciated by those skilled in the art, whenever a client 110 sends a message using the method of FIG. 2, a unique sequence number should be sent along with the message. Various ways of providing unique sequence numbers are known to those in the art.

If the MAC is verified in step 180 and the sequence number is verified in step 215, the server 120 sends an activate response message 220 back to client 110. This activate response message includes the response, a session identifier 152, a sequence number 254 along with a MAC 258.

In a similar fashion to that of FIG. 1, subsequent messages can proceed with the session identifier, the message and a sequence number with a MAC calculated for all of these things along with the key that is known to both the client 110 and server 120.

At the end of a session, either the server 120 or the client 110 can tear down a session by sending an end session message, which includes a session identifier, a sequence number and the MAC for all of these things. The session is then ended.

There could be a concern that if a password is used for the key, that the key might have bad entropy. One solution is to enforce desired password strength levels, such as by ensuring the password is of a minimum length, has both letters and numbers, and is not a common word. For example, in order to achieve reasonable key entropy that is acceptable to security experts, the password or combination of password and other security token could be 20 bytes or more.

It might be a security concern that the key remains the same for all sessions established by client 110 and server 120. As a solution, a unique key could be used for every session established by client 110 and server 120. Hence, a method can use the session identifier as part of the key once the session identifier has been received.

Figure 3:
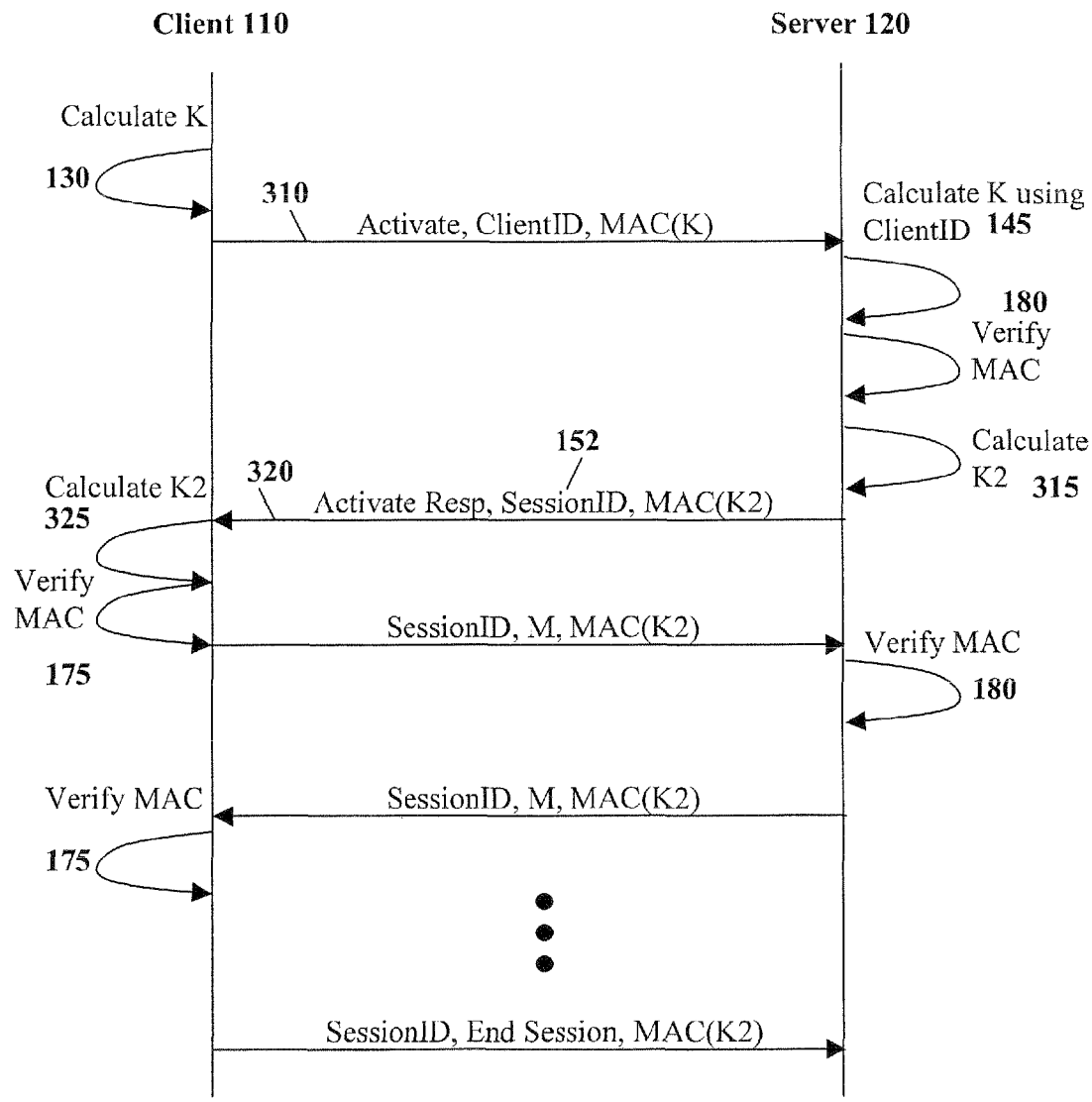
FIG. 3 is a data flow diagram showing further alternative exemplary communications between a client and a server.

Referring to FIG. 3, a client 110 communicates with a server 120. At the outset, the key is calculated in step 130 and an activate message, including the client identifier and a MAC is sent to the server in step 310. The key calculated in step 130 is based on the shared secret, such as the password. The server can then calculate the key K for the client identifier and verify the MAC in step 180. Thereafter a second key, designated herein as K2, is created by server 120 in step 315. K2 can be derived from a combination of the shared credentials, such as the password, along with the session identifier that is being assigned to the session with client 110. The algorithm for the combination of the shared credential plus the session identifier would be known to both the client 110 and server 120.

In step 320 the server 120 sends an authenticated response message back to client 110 which includes the activate response, the session identifier 152 along with the MAC created with key K2. Client 110 calculates key K2 based on the session identifier received in the message of step 320 in step 325 and stores the key K2. Client 110 then uses this key K2 for subsequent communications with server 120.

As will be appreciated, the method of FIG. 3 can also utilize the sequence numbers within messages and thus the methods of FIGS. 2 and 3 can be combined.

The use of a session identifier within the key provides a unique key for that session.

In a further alternative, a more secure symmetric key could be negotiated between the client and server utilizing the key based on the shared client credentials, thus allowing symmetric encryption. For example, the client could send a session activation message to the server. The server could then respond with a symmetric key that is encrypted using the shared key. Alternatively, the client could send the more secure key in the original message, since both the server and client would know the shared key used for decryption of the more secure key. The symmetric key could then be used for authentication and/or encryption of messages between the client and server. However, this enhancement requires symmetric encryption/decryption capabilities.

As will be appreciated by those skilled in the art, the above can be sent using any protocol appropriate for sending data but a data based protocol, such as UDP, is preferred for wireless devices.

FIGS. 1, 2 and 3 therefore show a method of communicating between a client and a server using shared secrets in order to create a key for hashing. The hash can then utilize this key and be incorporated into the message to ensure the authenticity of the message and prevent spoofing or the insertion or removal of data from a message. Known credentials could include items already known to both the client and server such as a password. Alternatives include adding keys to both the client and the server that would be known to the client and the server. This could be done during the provisioning of the mobile device either when it is being built or during subsequent provisioning.

Based on the above, the message cannot be modified in transfer since message integrity is protected by the MAC. It should also be appreciated that only the owners of the session can produce a valid message for the session. Thus the server is also authenticated.

Client 110 can be any device that can communicate with a server 120. Wired devices such as computers can be utilized; however, due to the nature of the protection and the lightweight computational requirements of the methods described herein, the method can also be used on devices that have limited computational abilities. Such devices can, for example, include some wireless devices where further benefit is derived from having a limited number of communications for a handshaking routine. One exemplary mobile device on which the present method can be used is described with reference to FIG. 4 below. This is not meant to be limiting, but is provided for illustrative purposes.

Figure 4:
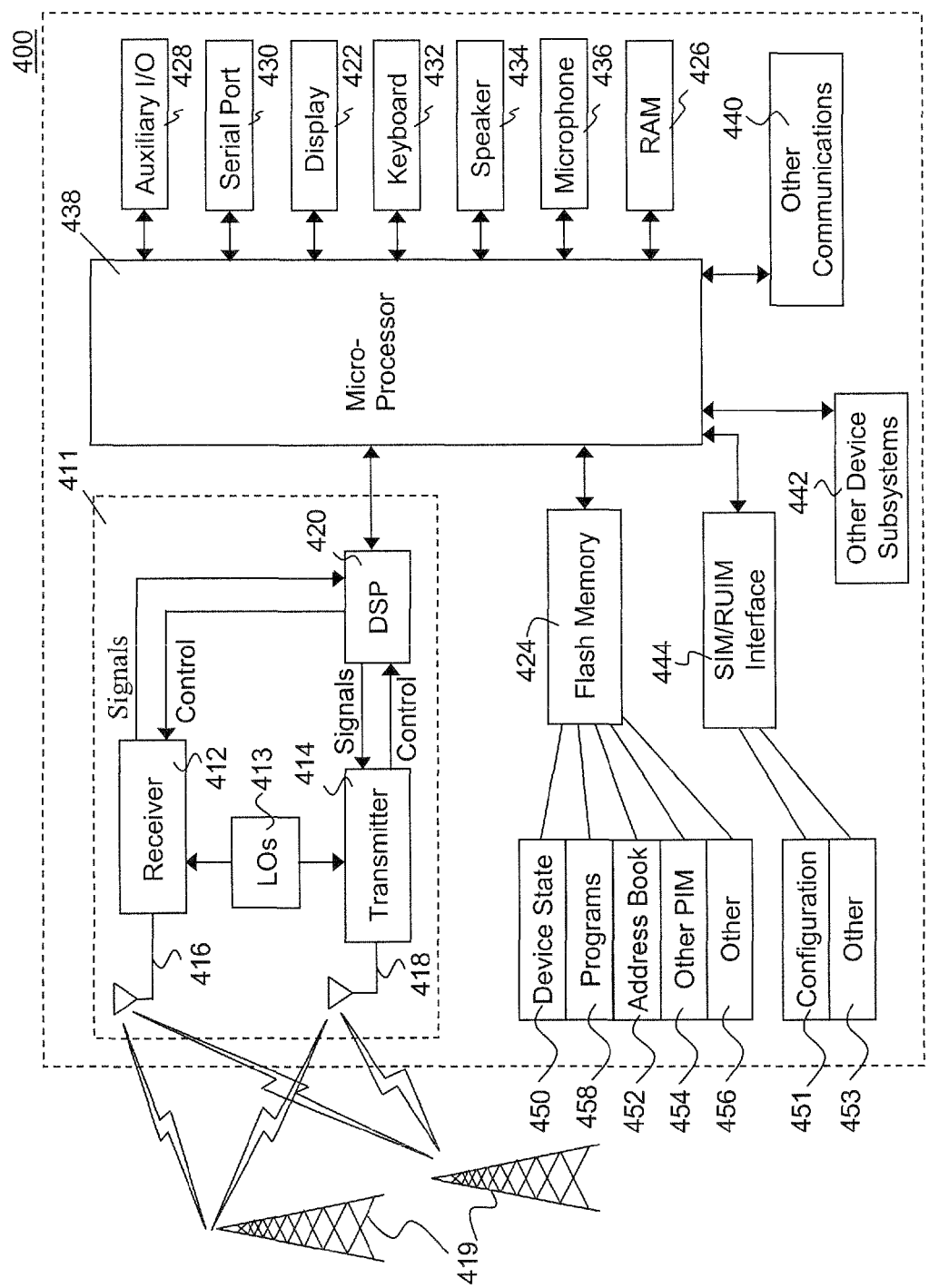
FIG. 4 is a block diagram showing an exemplary mobile device that can be used in association with the above.

FIG. 4 is a block diagram illustrating a mobile device apt to be used with preferred embodiments of the apparatus and method of the present application. Mobile device 400 is preferably a two-way wireless communication device having at least voice and data communication capabilities. Mobile device 400 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 400 is enabled for two-way communication, it will incorporate a communication subsystem 411, including both a receiver 412 and a transmitter 414, as well as associated components such as one or more, preferably embedded or internal, antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate.

Network access requirements will also vary depending upon the type of network 419. In some CDMA networks network access is associated with a client or user of mobile device 400. A CDMA mobile device may require a removable user identity module (RUIM) or a client identity module (SIM) card in order to operate on a CDMA network. The SIM/RUIM interface 444 is normally similar to a card-slot into which a SIM/RUIM card can be inserted and ejected like a diskette or PCMCIA card. The SIM/RUIM card can have approximately 64K of memory and hold many key configuration 451, and other information 453 such as identification, and client related information.

When required network registration or activation procedures have been completed, mobile device 400 may send and receive communication signals over the network 419. As illustrated in FIG. 4, network 419 can consist of multiple base stations communicating with the mobile device. For example, in a hybrid CDMA 1× EVDO system, a CDMA base station and an EVDO base station communicate with the mobile device and the mobile device is connected to both simultaneously. The EVDO and CDMA 1× base stations use different paging slots to communicate with the mobile device.

Signals received by antenna 416 through communication network 419 are input to receiver 2212, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Mobile device 400 preferably includes a microprocessor 438 which controls the overall operation of the device. Communication functions, including at least data and voice communications, are performed through communication subsystem 411. Microprocessor 438 also interacts with further device subsystems such as the display 422, flash memory 424, random access memory (RAM) 426, auxiliary input/output (I/O) subsystems 428, serial port 430, one or more keyboards or keypads 432, speaker 434, microphone 436, other communication subsystem 440 such as a short-range communications subsystem and any other device subsystems generally designated as 2242. Serial port 430 could include a USB port or other port known to those in the art.

Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the microprocessor 438 is preferably stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Microprocessor 438, in addition to its operating system functions, preferably enables execution of software applications on the mobile device. A predetermined set of applications that control basic operations, including at least data and voice communication applications for example, will normally be installed on mobile device 400 during manufacturing. Other applications could be installed subsequently or dynamically.

A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 419. In a preferred embodiment, the PIM data items are seamlessly integrated, synchronized and updated, via the wireless network 419, with the mobile device user's corresponding data items stored or associated with a host computer system. Further applications may also be loaded onto the mobile device 400 through the network 419, an auxiliary I/O subsystem 428, serial port 430, short-range communications subsystem 440 or any other suitable subsystem 442, and installed by a user in the RAM 426 or preferably a non-volatile store (not shown) for execution by the microprocessor 438. Such flexibility in application installation increases the functionality of the device and may provide enhanced on-device functions, communication-related functions, or both. For example, secure communication applications may enable electronic commerce functions and other such financial transactions to be performed using the mobile device 400.

In a data communication mode, a received signal such as a text message or web page download will be processed by the communication subsystem 411 and input to the microprocessor 438, which preferably further processes the received signal for output to the display 422, or alternatively to an auxiliary I/O device 428.

A user of mobile device 400 may also compose data items such as email messages for example, using the keyboard 432, which is preferably a complete alphanumeric keyboard or telephone-type keypad, in conjunction with the display 422 and possibly an auxiliary I/O device 428. Such composed items may then be transmitted over a communication network through the communication subsystem 411.

For voice communications, overall operation of mobile device 400 is similar, except that received signals would preferably be output to a speaker 434 and signals for transmission would be generated by a microphone 436. Alternative voice or audio I/O subsystems, such as a voice message recording subsystem, may also be implemented on mobile device 400. Although voice or audio signal output is preferably accomplished primarily through the speaker 434, display 422 may also be used to provide an indication of the identity of a calling party, the duration of a voice call, or other voice call related information for example.

Serial port 430 in FIG. 4, would normally be implemented in a personal digital assistant (PDA)-type mobile device for which synchronization with a user's desktop computer (not shown) may be desirable, but is an optional device component. Such a port 430 would enable a user to set preferences through an external device or software application and would extend the capabilities of mobile device 400 by providing for information or software downloads to mobile device 400 other than through a wireless communication network. The alternate download path may for example be used to load an encryption key onto the device through a direct and thus reliable and trusted connection to thereby enable secure device communication. As will be appreciated by those skilled in the art, serial port 430 can further be used to connect the mobile device to a computer to act as a modem.

Other communications subsystems 440, such as a short-range communications subsystem, is a further optional component which may provide for communication between mobile device 400 and different systems or devices, which need not necessarily be similar devices. For example, the subsystem 440 may include an infrared device and associated circuits and components or a Bluetooth™ communication module to provide for communication with similarly enabled systems and devices.

The embodiment of FIG. 4 includes many aspects that may not be necessary for a device used to implement the methods herein.

A more basic device could include only a processor, memory and communications subsystem. In particular, a device requires a processor to produce the key K and the MAC based on key K. Memory could be used to store the shared credentials such as the password. The communications subsystem could include wireless communications systems such as a radio subsystem to communicate with a cellular network or wireless local area network (WLAN) or a modem or cable connection for a wired connection. Other devices with memory, a processor and communications subsystem with combinations of some features from FIG. 4 could also be used.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method for client credential based authentication of messages between a client and a server, said client and server both knowing said client credential, the method comprising the steps of:
    utilizing the client credential to create a first key;
    preparing a message for transmission at the client;
    computing, at the client, a message authentication code 'MAC' with the first key and the message by using a MAC function known to both the client device and the server;
    sending the message and the MAC from the client to the server;
    receiving, at the client, a response message from the server, the response message including a session identifier;
    utilizing the client credential and the session identifier to create a second key; and
    using the MAC function and the second key to authenticate subsequent messages between the client and the server;
    wherein creation of at least one of the first key and the second key is performed using a secure pseudo-random number generator that employs a seed being the client credential combined with either a security token or a nonce.

2. The method of claim 1, wherein said client credential is a password.

3. The method of claim 2, wherein creation of said first key is further performed by repeating said password until a desired key length is achieved.

4. The method of claim 1, wherein creation of at least one of said first key and said second key is further performed by utilizing a hash function known to both the client and server.

5. The method of claim 4, wherein the results of the hash function are truncated to a desired key length.

6. The method of claim 1, wherein the security token includes information provided by the client to the server offline, said information including one or more items selected from the group consisting of: birthdate, birthplace, mother's maiden name, and security answers.

7. The method of claim 1, wherein said nonce is from an activation message.

8. The method of claim 1, wherein said using the MAC function and the second key to authenticate subsequent messages comprises:
    adding a MAC computed from the message and the second key to the message to create a secure message; and
    sending the secure message.

9. The method of claim 8, wherein said secure message is verified as authentic and unaltered by recreating the MAC upon receipt of the secure message and comparing the recreated MAC with the received MAC.

10. The method of claim 8, wherein said message is an activation request message and includes a client identifier.

11. The method of claim 8, wherein the message is an HTTP message, and the MAC is added to an HTTP footer.

12. The method of claim 1, further comprising the step of adding a sequence number to the message before said using step.

13. A client device adapted for client credential based authentication of messages between the client device and a server, said client device and server both knowing said client credential, the client device comprising:
    memory for storing the shared credential;
    a processor communicating with said memory and adapted to:
        prepare a message for transmission;
        utilize the client credential to create a first key;
        use the key and a message to create a message authentication code 'MAC' using a MAC function known to both the client device and the server;
        add the message authentication code to the message to create a secure message;
        send the secure message to the server;
        receive a response message from the server, the response message including a session identifier;
        utilize the client credential and the session identifier to create a second key;
        use the MAC function and the second key to authenticate subsequent messages received from the server; and
    a communication subsystem adapted to send the secure message, wherein creation of at least one of the first key and the second key is performed using a secure pseudo-random number generator that employs a seed being the client credential combined with either a security token or a nonce.

14. The client device of claim 13, wherein said client credential is a password.

15. The client device of claim 13, wherein said processor is adapted to create the first key by further performing an operation of repeating the password until a desired key length is achieved.

16. The client device of claim 13, wherein said processor is adapted to create at least one of the first key and the second key by further performing an operation of utilizing a hash function known to both the client and server.

17. The client device of claim 16, wherein the processor is further adapted to truncate the results of the hash function to a desired key length.

18. The client device of claim 13, wherein the security token includes information provided by the client device to the server offline, said information including one or more items selected from the group consisting of: birthdate, birthplace, mother's maiden name, and security answers.

19. The client device of claim 13, wherein the nonce is from an activation message.

20. The client device of claim 13, wherein said message is an activation request message and includes a client identifier.

21. The client device of claim 13, wherein the processor is further adapted to add a sequence number to the message.

22. The client device of claim 13, wherein said client device is a mobile device.

23. A non-transitory computer readable medium storing program code executable by a computer processor for causing client credential based authentication of messages between a client and a server, said client and server both knowing said client credential, comprising:

utilizing the client credential to create a first key;
preparing a message for transmission at the client;
computing, at the client, a message authentication code 'MAC' with the first key and the message by using a MAC function known to both the client device and the server;
sending the message and the MAC from the client to the server;
receiving, at the client, a response message from the server, the response message including a session identifier;
utilizing the client credential and the session identifier to create a second key; and
using the MAC function and the second key to authenticate subsequent messages between the client and the server;
wherein creation of at least one of the first key and the second key is performed using a secure pseudo-random number generator that employs a seed being the client credential combined with either a security token or a nonce.

24. The non-transitory computer-readable medium of claim 23, wherein said client credential is a password.

25. The non-transitory computer-readable medium of claim 23, wherein the security token includes information provided by the client to the server offline, said information including one or more items selected from the group consisting of: birthdate, birthplace, mother's maiden name, and security answers.

26. The non-transitory computer-readable medium of claim 23, wherein said nonce is from an activation message.

27. The non-transitory computer-readable medium of claim 23, wherein said using the MAC function and the second key to authenticate subsequent messages comprises:

adding a MAC computed from the message and the second key to the message to create a secure message; and
sending the secure message.

28. The non-transitory computer-readable medium of claim 27, wherein said secure message is verified as authentic and unaltered by recreating the MAC upon receipt of the secure message and comparing the recreated MAC with the received MAC.

29. The non-transitory computer-readable medium of claim 27, wherein said message is an activation request message and includes a client identifier.

30. The non-transitory computer-readable medium of claim 27, wherein the message is an HTTP message, and the MAC is added to an HTTP footer.

31. The non-transitory computer-readable medium of claim 23, further comprising the step of adding a sequence number to the message before said using step.

32. The non-transitory computer-readable medium of claim 23, wherein said client credential is a password.

33. The non-transitory computer-readable medium of claim 32, wherein creation of said first key is further performed by repeating said password until a desired key length is achieved.

34. The non-transitory computer-readable medium of claim 23, wherein creation of at least one of said first key and said second key is further performed by utilizing a hash function known to both the client and server.

35. The non-transitory computer-readable medium of claim 34, wherein the results of the hash function are truncated to a desired key length.

* * * * *